United States Patent [19]

Palm

[11] Patent Number: 5,025,562
[45] Date of Patent: Jun. 25, 1991

[54] COUNTERBALANCED RECIPROCATING MECHANISM

[75] Inventor: Bernhard Palm, Brookfield, Wis.

[73] Assignee: Milwaukee Electric Tool Corporation, Brookfield, Wis.

[21] Appl. No.: 541,093

[22] Filed: Jun. 20, 1990

Related U.S. Application Data

[63] Continuation-in-part of Ser. No. 487,219, Mar. 1, 1990, abandoned.

[51] Int. Cl.⁵ ............... B23D 49/04; B23D 49/02; F16H 23/00
[52] U.S. Cl. .................................... 30/392; 30/393; 74/60
[58] Field of Search .................. 30/392, 393, 274; 74/58, 60, 411.5; 475/164

[56] References Cited

U.S. PATENT DOCUMENTS

| | | | |
|---|---|---|---|
| 2,793,661 | 5/1957 | Olson | 30/393 |
| 3,590,659 | 7/1971 | Maroth | 475/164 |
| 3,863,342 | 2/1975 | Griffies et al. | 30/393 |
| 3,945,120 | 3/1976 | Ritz | 30/393 |
| 4,537,264 | 8/1985 | Schmid et al. | 74/60 |
| 4,688,439 | 8/1987 | Cureton et al. | 74/60 |

FOREIGN PATENT DOCUMENTS

| | | | |
|---|---|---|---|
| 1014826 | 2/1977 | Canada | 30/393 |
| 2180791 | 4/1987 | United Kingdom | 30/393 |

Primary Examiner—Douglas D. Watts
Assistant Examiner—Paul M. Heyrana, Sr.
Attorney, Agent, or Firm—Michael, Best & Friedrich

[57] ABSTRACT

The reciprocating saw incorporates a counterbalanced reciprocating drive having a jackshaft on which primary and secondary wobble plates are mounted. The wobble plates drive reciprocating saw spindle and a concentric counterweight in opposite directions to cancel out the induced vibrations. The spindle reciprocates in a bearing sleeve having a slot through which the primary wobble arm projects to drive the spindle. The counterweight slides on the outside of the sleeve and has a slot which slides over the primary arm. The secondary arm drives the counterweight. The arms are out of alignment to permit their strokes to overlap without collision. The wobble plates are angled out of 180° so the spindle and counterbalance reverse at the same time. The cutting stroke and speed are increased and vibration is insignificant. The drive has many other uses.

19 Claims, 2 Drawing Sheets

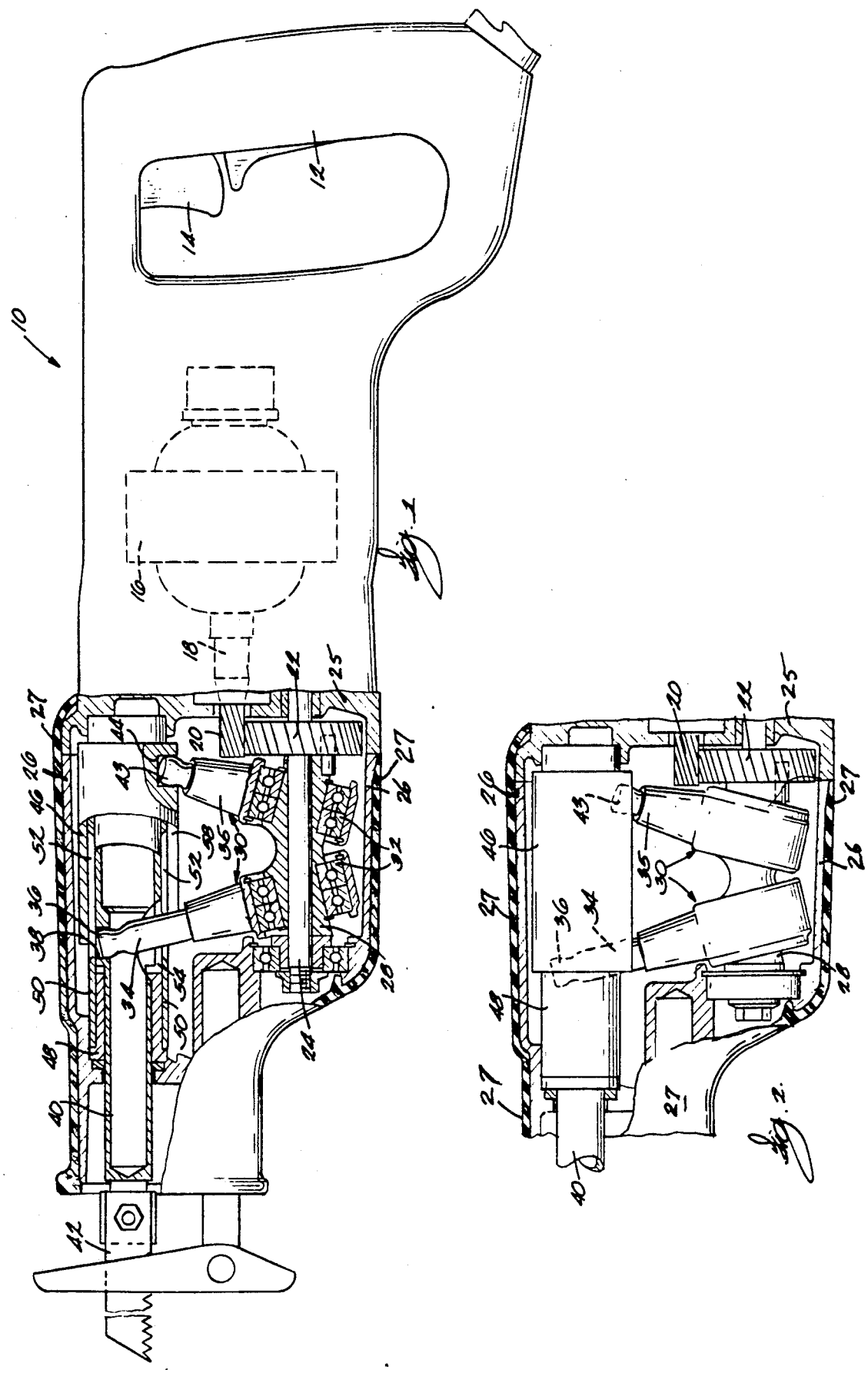

COUNTERBALANCED RECIPROCATING MECHANISM

This application is a continuation-in-part of U.S. application Ser. No. 487,219, filed on 03/01/90, now abandoned.

BACKGROUND OF THE INVENTION

This invention relates to in-line reciprocating motion of the type used in saws in which the saw blade reciprocates on an axis generally in line with or parallel to the axis of the drive motor. Reciprocating motion imparted to a saw blade through a wobble plate causes vibration which in turn constitutes a limitation on the tool. Due to the magnitude and frequency of this vibration, it is difficult to obtain an accurate cut. Furthermore, to avoid excessive vibration, the stroke of the saw blade has to be limited and this limits the sawing speed of the tool.

Reciprocating motion is used in other tools and machines but the vibration inherent in such motion is a limitation on use.

SUMMARY OF THE INVENTION

This invention provides a counterbalanced in-line reciprocating drive using dual wobble plates.

The object of this invention is to minimize vibration of a tool or machine employing reciprocating motion.

The drive is shown and claimed alone and in conjunction with an in-line saw which cuts faster and with less vibration than any reciprocating saw on the market. This is accomplished with only a slight increase in the length of the tool.

Another object of this invention is to increase the stroke and speed of the saw blade to thereby increase the cutting speed of the tool.

More specifically, this invention provides a drive having two wobble plates, one driving a reciprocating spindle and the other driving a reciprocating counterbalance. The wobble plate drive arms are angled with respect to each other (when viewed axially) to avoid interference. The wobble plate (input) planes are angled at the same angle from 180° apart so the motion of the shaft and counterbalance reverse at the same instant, thus avoiding a phase shift in the forces. The length of the wobble arms and the mass of the spindle and counterbalance are proportional and the resulting forces are equal and opposite, thus cancelling out axial vibration while leaving only slight vertical motion (due to the arcuate motion of the arms) which is not cancelled out but is not appreciable.

When this drive mechanism is used in an in-line reciprocating saw, the tool feels essentially vibration free, even at high speed. Prior art saws of this general type have substantial vibration.

The high speed of an in-line saw using this drive is well in excess of the speed which could be used with the prior art in which vibration limited the useable speed and limited the cutting speed of the saw blade.

The increased stroke of the saw results in the present tool having the longest stroke in the industry. This long stroke plus higher speed translates into the fastest cutting speed in the industry.

REFERENCE TO COPENDING APPLICATION

My application Ser. No. 537428, filed 6/13/90 shows and claims details of the insulating boot covering the gear case.

My application Ser. No. 537474, filed 6/13/90 claims the removeable shoe used with the saw disclosed herein.

BRIEF DESCRIPTION OF THE DRAWING

FIG. 1 is a side elevation partly in section showing the present invention.

FIG. 2 is a detail view of a portion of FIG. 1 to give additional perspective to the arrangement of the parts.

DETAILED DESCRIPTION OF DRAWINGS

Figure 4:
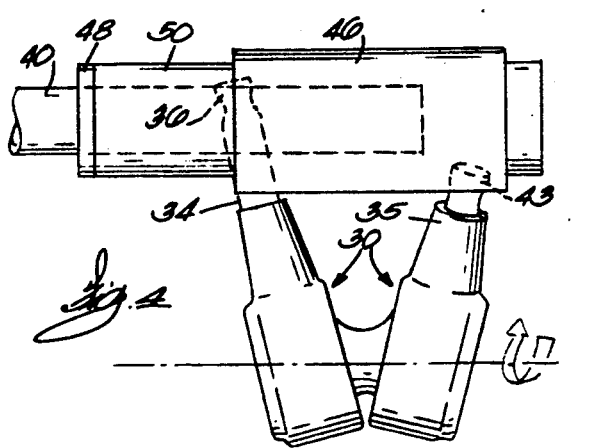
FIGS. 4, 5, 6 and 7 show a series of views extracted from FIG. 2 showing the sequence of operation of the parts going through half of a revolution of the jackshaft.

The present in-line counterbalanced reciprocating drive mechanism using two wobble plates can be used in many tools and machines. One wobble plate drives the reciprocating spindle while the other wobble plate drives a counterbalance. The mechanism is shown in a saw.

The in-line saw shown in FIG. 1 is broadly similar to the SAWZALL in-line saw manufactured by applicant's assignee but this construction provides for counterbalancing the forces generated by the reciprocating action and results in a far smoother and far superior product.

The main body 10 of the saw is provided with a handle portion 12 having an on-off switch 14 which controls energization of motor 16. Motor shaft 18 is provided with a drive gear 20 which engages gear 22 mounted on jackshaft 24 journaled in the gear case 26 and diaphragm 25. The gear case 26 is covered by a urethane or rubber insulating "boot" 27 which serves several functions disclosed in detail in my application mentioned above. The jackshaft has a wobble drive member 28 fixed thereon. Two wobble plate assemblies 30 are mounted on drive member 28. Each assembly 30 has an input bearing 32 mounted on wobble plate drive member 28. The left hand wobble plate assembly 30 is the primary assembly while the right hand assembly is the secondary wobble plate. Each assembly 30 has a drive arm engaging the part driven by that assembly. Thus the primary wobble plate has a drive arm 34 having a somewhat spherical tip 36 engaged in a suitable hole 38 in the reciprocating spindle 40 which carries the saw blade 42. The secondary wobble plate has a spherical tip 43 engaging hole 44 in counterweight 46.

Reciprocating spindle 40 slides inside of and is guided by spindle bearing 48 fixed in the gear case. Sleeve 50 is fixed on the outside of bearing 48. Counterweight 46 slides on the outside of sleeve 50. Sleeve 50 is provided with opposed slots 52 and the primary drive arm projects through the bottom slot 52 in sleeve 50, through slot 54 in spindle 40, through the spindle so tip 36 engages the hole 38 in the top of the spindle 40 (see FIG. 1). As the wobble plate moves arm 34 to the position shown in FIG. 7 the arm and counterweight 46 move in opposite directions and the arm travels to the right in slot 58 in the counterweight. This engagement of arm 34 with the slot 54 (in spindle 40) and slot 58 (in the counterweight) confines travel of the spindle and counterweight to reciprocating action; they cannot rotate. And, since the counterweight can only reciprocate, wobble arm 35 which drives the counterweight can only oscillate through an arc and rotate slightly.

Figure 3:
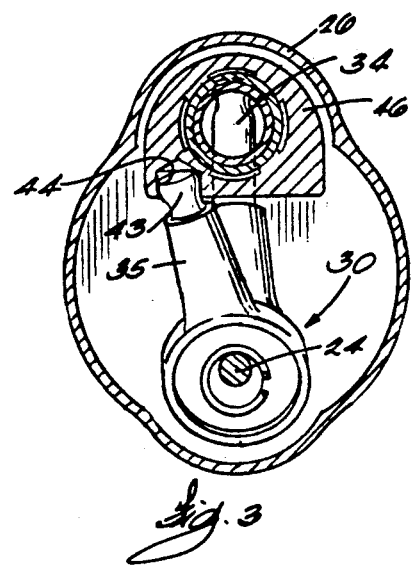
FIG. 3 is a section through the right portion of the drive mechanism and looking left in either of FIG. 1 or FIG. 2.
Figure 5:
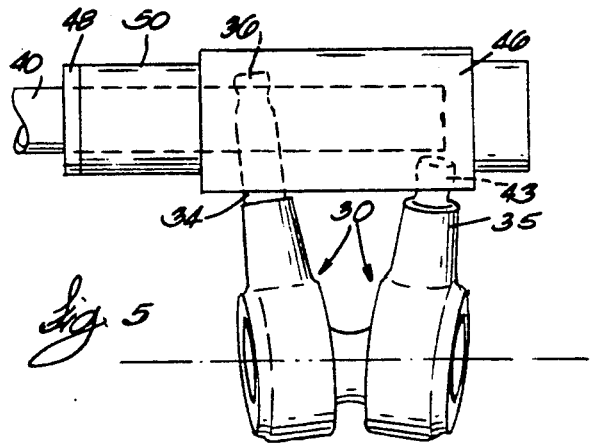
Figure 6:
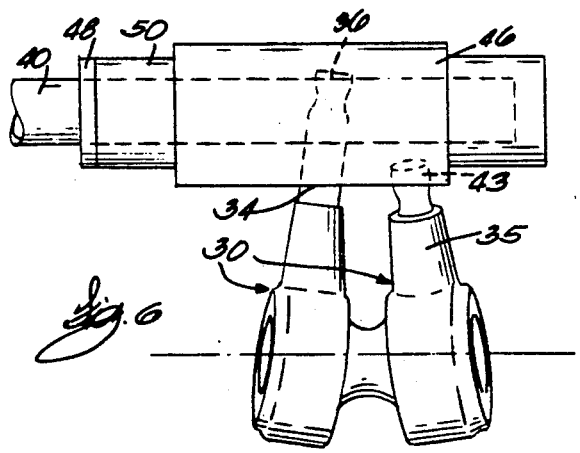
Figure 7:
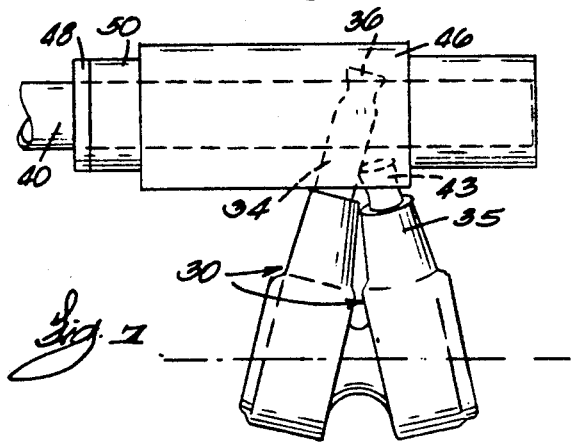

When one considers the sequence of action from FIG. 4 to FIG. 5 to FIG. 6 and then to FIG. 7 it is apparent that arms 34, 35 would strike each other ... except for the fact the arms are out of alignment as may be seen in FIG. 3. This means that when the arms reach the position of FIG. 7, they do not engage each other. This offset angle would make the forces non-cancelling if the drive inputs to both wobble plate assemblies were 180° out of phase which would be the normal assumption if the forces are to be cancelled. Therefore, the wobble plate drives are offset angularly from the "normal" 180° to thereby compensate for the arms being offset the same angle. This results in cancelling the reciprocating forces and results in a very smooth drive with only minor vibration. This makes it possible to cut more accurately.

An important feature of this mechanism is that the counterweight and the spindle are coaxial. Only by having the center of mass of each reciprocating part on the same axis can opposing forces be cancelled without creating other force couples.

The stroke and weight of the counterweight and arm 35 are proportioned to the stroke and weight of the spindle, average saw blade and arm 34 to cancel the forces while providing the spindle and saw blade with a longer stroke. The stroke is increased from 0.75" to 1.25" compared with the SAWZALL saw mentioned before.

The offset angle of the wobble plate input planes and of the arms can be avoided if one is willing to increase the length of the tool. Such an increase is considered undesireable and unacceptable.

The type of motor driving the jackshaft makes no difference. While the reciprocating drive is shown in a saw, it could be used in a hedge trimmer, paint chipper or what-have-you. The reciprocating drive has wide potential use as well as being outstanding in its use in the saw.

I claim:

1. A reciprocating drive mechanism comprising,
a housing,
a jackshaft rotatably mounted in said housing,
means rotating said jackshaft,
a spindle mounted in said housing for reciprocating motion,
a counterweight mounted in said housing for reciprocating motion parallel to said spindle,
primary and secondary wobble plates mounted on said jackshaft and connected to said spindle and said counterweight respectively,
said wobble plates being at an angle with respect to each other to reciprocate said spindle and said counterweight in opposite directions.

2. A drive mechanism in accordance with claim 1 in which the mass and stroke of said primary wobble plate and said spindle are proportioned relative to the mass and stroke of said secondary wobble plate and said counterweight so the axial forces induced by reciprocation are substantially cancelled.

3. A drive mechanism in accordance with claim 2 in which said spindle and said counterweight are concentric.

4. A drive mechanism in accordance with claim 3 including a guide sleeve mounted in said housing,
an axial slot in said sleeve,
said spindle being slideably mounted in said sleeve,
said primary wobble plate including a drive arm,
said drive arm projecting through said slot in said sleeve to drivingly engage said spindle and being constrained by said slot to motion in a plane including the axes of said spindle and said jackshaft.

5. A drive mechanism in accordance with claim 4 in which said counterweight is mounted on said sleeve for reciprocating motion, said counterweight including a slot receiving said primary wobble plate drive arm to restrain said counterweight against rotation.

6. A drive mechanism in accordance with claim 5 in which said second wobble plate includes a drive arm engaging said counterweight.

7. A reciprocating saw comprising,
a housing including a gear case,
a motor in said housing and having a motor shaft,
a jackshaft rotatably mounted in said housing parallel to said motor shaft,
gearing connecting said motor shaft to said jackshaft,
a spindle mounted in said gear case for reciprocating motion,
a counterweight mounted in said gear case for reciprocating motion parallel to said spindle,
primary and secondary wobble plates mounted on said jackshaft and connected to said spindle and said counterweight respectively,
said wobble plates being at an angle with respect to each other to reciprocate said spindle and said counterweight in opposite directions.

8. A reciprocating saw in accordance with claim 7 in which the mass and stroke of said primary wobble plate and said spindle are proportioned relative to the mass and stroke of said secondary wobble plate and said counterweight so the axial forces induced by reciprocation are substantially cancelled.

9. A reciprocating saw in accordance with claim 8 in which said spindle and said counterweight are concentric.

10. A reciprocating saw in accordance with claim 9 including a guide sleeve mounted in said housing,
an axial slot in said sleeve,
said spindle being slideably mounted in said sleeve,
said primary wobble plate including a drive arm,
said drive arm projecting through said slot in said sleeve to drivingly engage said spindle and being constrained by said slot to motion in a plane including the axes of said spindle and said jackshaft.

11. A reciprocating saw in accordance with claim 10 in which said counterweight is mounted on said sleeve for reciprocating motion, said counterweight including a slot receiving said primary wobble plate drive arm to restrain said counterweight against rotation.

12. A reciprocating saw in accordance with claim 11 in which said second wobble plate includes a drive arm engaging said counterweight.

13. A reciprocating saw in accordance with claim 7 in which said spindle and said counterweight are concentric.

14. A reciprocating saw in accordance with claim 7 including a guide sleeve mounted in said housing,
an axial slot in said sleeve,
said spindle being slideably mounted in said sleeve,
said primary wobble plate including a drive arm,
said drive arm projecting through said slot in said sleeve to drivingly engage said spindle and being constrained by said slot to motion in a plane including the axes of said spindle and said jackshaft.

15. A reciprocating saw comprising,
a housing including a gear case, a motor in said housing and having a motor shaft,
a jackshaft rotatably mounted in said housing parallel to said motor shaft,
gearing connecting said motor shaft to said jackshaft,
a primary bearing mounted at an angle on said jackshaft,
a primary wobble plate mounted on said primary bearing and including a drive arm,
a spindle mounted in said gear case for reciprocating motion,
said drive arm being connected to said spindle to reciprocate said spindle as said jackshaft is rotated,
a counterweight mounted in said gear case for reciprocating motion parallel to said spindle axis,
a second bearing mounted at an angle on said jackshaft,
a second wobble plate mounted on said second bearing and having a drive arm connected to said counterweight,
said primary and secondary wobble drive arms being angularly offset with respect to the axis of said jackshaft,
the planes of said primary and secondary bearings being offset from 180° apart by substantially the same angle as the angular offset of said drive arms.

16. A reciprocating saw comprising,
a housing including a gear case,
a motor in said housing and having a motor shaft,
a jackshaft rotatably mounted in said housing parallel to said motor shaft,
gearing connecting said motor shaft to said jackshaft,
a primary bearing mounted at an angle on said jackshaft,
a primary wobble plate mounted on said primary bearing and including a drive arm,
a spindle mounted in said gear case for reciprocating motion,
said drive arm being connected to said spindle to reciprocate said spindle as said jackshaft is rotated,
a counterweight mounted in said gear case for reciprocating motion parallel to said spindle,
a second bearing mounted at an angle on said jackshaft,
a second wobble plate mounted on said second bearing and having a drive arm connected to said counterweight,
said drive arms reciprocating said spindle and said counterweight in opposite directions to substantially cancel out the axial vibrations induced by such reciprocation.

17. A reciprocating drive mechanism comprising,
a housing,
a spindle mounted in said housing for reciprocating motion,
a counterweight mounted in said housing coaxial with said spindle and moveable relative to said spindle, and
first and second drive means for reciprocating said spindle and said counterweight in opposite directions so the axial forces induced by reciprocation are substantially cancelled,
said first and second drive means being of the same type so the forces induced in one drive means substantially cancel the forces induced in the other drive means.

18. A reciprocating drive mechanism according to claim 17 in which the spindle supports a tool and the axial forces induced by the stroke and mass of said counterweight approximate the axial forces induced by the stroke and combined mass of said spindle and said tool.

19. A reciprocating drive mechanism comprising,
a housing,
a spindle mounted in said housing for reciprocating motion,
a counterweight mounted in said housing for reciprocating motion relative to said spindle,
said spindle and said counterweight being concentric, and
first and second drive means for reciprocating said spindle and said counterweight in opposite directions so the axial forces induced by reciprocation are substantially cancelled,
said first and second drive means being of the same type so the forces induced in one drive means substantially cancel the forces induced in the other drive means.

* * * * *